United States Patent [19]

Marzouk

[11] 3,998,531
[45] Dec. 21, 1976

[54] METHOD OF MAKING PROTECTIVE OPTICAL COMPONENTS

[76] Inventor: Marzouk Y. Marzouk, 503 S. Fifth St., San Jose, Calif. 95112

[22] Filed: Oct. 28, 1975

[21] Appl. No.: 625,916

Related U.S. Application Data

[63] Continuation-in-part of Ser. No. 520,772, Nov. 4, 1974, abandoned.

[52] U.S. Cl. .............................. 351/166; 351/177; 156/73.1; 264/1; 264/88; 428/436
[51] Int. Cl.² ...................... G02C 7/06; G02C 7/02
[58] Field of Search ............... 351/159, 166, 177; 428/436; 156/335, 73.1; 264/1, 88

[56] References Cited

UNITED STATES PATENTS

| | | | |
|---|---|---|---|
| 2,361,589 | 10/1944 | Bennett et al. | 351/166 |
| 2,453,665 | 11/1948 | Kropa | 351/159 |
| 3,396,214 | 8/1968 | Crandon | 156/73.1 |

*Primary Examiner*—Edward G. Whitby
*Attorney, Agent, or Firm*—Phillips, Moore, Weissenberger, Lempio & Strabala

[57] ABSTRACT

A method of making opthalmic lenses is disclosed comprising the steps of forming at least a major body portion of a first lens body from a transparent plastic resinous material having an index of refraction greater than that of crown glass, rough shaping the first lens body portion to provide the lens configuration, selecting first and second thin plano glass shields having the respective shapes to form the different sides of the main body portion, shaping the first lens body portion between the shields by means of pressure and bonding each of the shields to the respective sides of the first lens portion.

13 Claims, 6 Drawing Figures

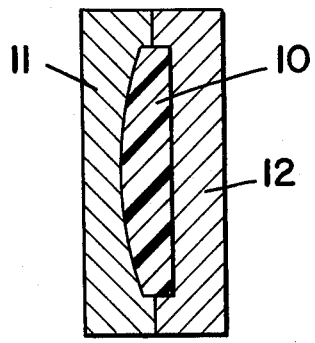
FIG_1
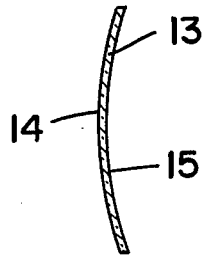
FIG_2
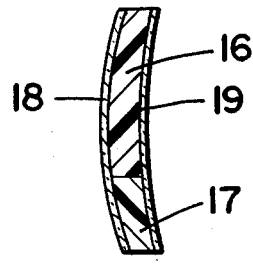
FIG_3
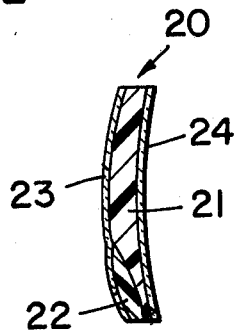
FIG_4
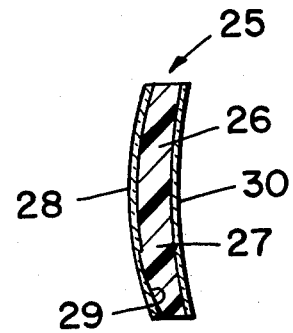
FIG_5
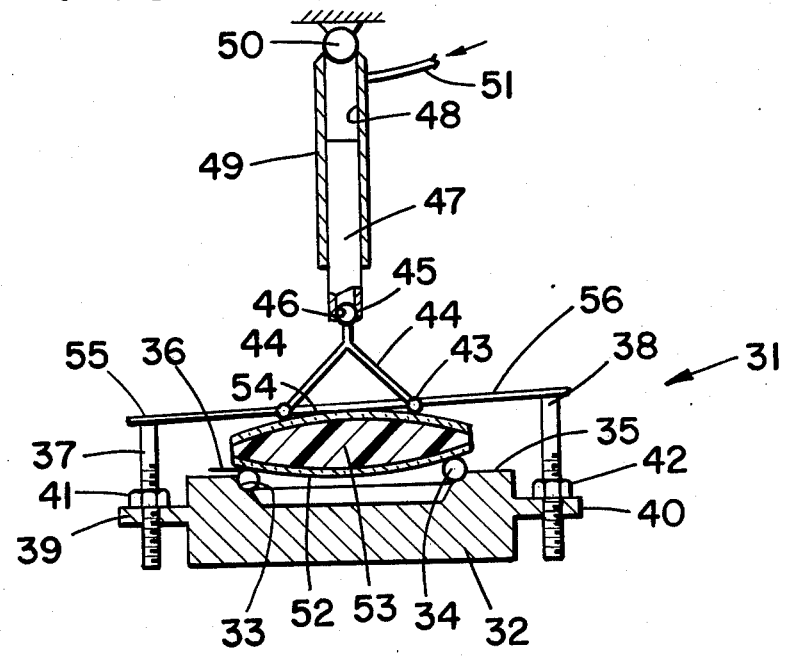
FIG_6

METHOD OF MAKING PROTECTIVE OPTICAL COMPONENTS

REFERENCE TO RELATED APPLICATIONS

The present application is a continuation in part of my copending application Ser. No. 520,772, filed Nov. 4, 1974 now abandoned and entitled PROTECTIVE OPTICAL COMPONENTS.

BACKGROUND OF THE INVENTION

The present invention relates to opthalmic lenses and pertains particularly to a method of constructing lenses to have a high power and low weight.

In the past, glass has been the traditional lens material. Glass, however, has a number of disadvantages. One of the disadvantages being that it is difficult to fabricate into complex optical components. Another disadvantage is that they are very expensive to fabricate and, when used to make high-power lenses, are fairly heavy in weight. Still another disadvantage of glass lenses is that they are breakable. While glass lenses can be treated by tempering to reduce their fragile nature, over a period of time they lose their tough nature and can become scratched and pitted. Such lenses are then difficult to regrind to refinish the surface.

In recent years, plastic materials have come into use as a material for the production of optical components. They have the advantage of being less expensive to fabricate and are usually lighter in weight than an equivalent lens of the same optical size made of glass. The conventionally used plastics, however, have the drawback of having a lower index of refraction than glass, and for this reason an equivalent lens is thicker. This constitutes a disadvantage for the production of high-power lenses.

Another disadvantage of such plastic materials is that they are easily scratched. They also have the disadvantage of being easily distorted by mounting in frames when critical tolerances are not carefully observed.

Still another disadvantage of plastic is that it is hydrostatic and it also absorbs dirt.

There have been proposals in the past to overcome the dirt-absorbing and scratch problems of plastic lenses by incorporating them within, or covering them with, sheets of glass. Among the prior art approaches to these problems are the following patents: U.S. Pat. No. 2,287,546, issued June 23, 1942 to Binda; U.S. Pat. No. 2,361,589, issued Oct. 31, 1944 to Bennett et al; and U.S. Pat. No. 2,540,953, issued Feb. 6, 1951 to Kessler.

These, however, have not considered the problem of reducing the weight and thickness of a high-power, low-cost lens.

SUMMARY AND OBJECTS OF THE INVENTION

The primary object of the present invention is to provide a method of constructing high-power lenses that are light in weight and highly resistant to distortion and scratching.

Another object of the present invention is to provide a method of manufacturing high-power lenses of a plastic material shielded with glass to provide an improved optical lens.

A further object is to provide an improved lens.

In accordance with the primary aspects of the present invention, a lens of a single or multi-focal characteristic is constructed by forming the main lens body portion of a plastic material having a high index of refraction exceeding that of glass, and shaping the plastic body portion between thin plano glass shields with heat and application of pressure on the shields and then bonding the shields to the main body portion.

BRIEF DESCRIPTION OF THE DRAWING

The above and other objects and advantages of the present invention will become apparent from the following description when read in conjunction with the drawing, wherein:

FIG. 1 is an elevational view illustrating a step in the process of constructing a component of a lens of the present invention;

FIG. 2 is an elevational view illustrating a second component for the lens of the present invention;

FIG. 3 is an elevational view illustrating a completed lens in accordance with the present invention;

FIG. 4 is an elevational view illustrating another lens of the present invention;

FIG. 5 is an elevational view illustrating a further embodiment of the present invention; and, FIG. 6 is an elevational view, in section, illustrating apparatus and a further step in carrying out the present invention.

DETAILED DESCRIPTION OF THE DRAWING

Turning now to the drawing, and particularly to FIG. 1, there is illustrated a first component of a lens in accordance with the present invention, and a method of making the same. The main body portion of the lens of the present invention, indicated by the numeral 10, is first molded by injection molding into a semi-finished lens body or blank and constructed of a suitable transparent plastic material having an index of refraction exceeding that of glass. The material may be transparent clear or transparent colored. This first body 10 is molded within a mold. schematically illustrated, having first and second mold pieces 11 and 12. The mold or die pieces 11, 12 may be mounted in a suitable molding machine and the blanks 10 produced in a well-known, high-speed production process.

Any suitable transparent plastic material having an index of refraction, exceeding that of crown glass, may be utilized. For example, the following materials have the indicated suitable index of refraction:

polyvinyl carbazole — 1.68;
phenol form adehyde — 1.7;
chlorinated diphenol resin — 1.7; and,
cresylic acid formaldehyde — 1.65.

Other plastics and resins may be found which are similarly suitable.

Thus, the first basic step of the present invention is that of selecting a suitable plastic material, as above, and the second step forming a blank, the first body portion of the lens, as described.

A further step, in accordance with the present invention, is the forming or otherwise obtaining a first thin glass shield, such as shown in FIG. 2 from a suitable source. The first lens shield 13 may be made such as by grinding and polishing or by blowing and polishing. This first shield 13 is plano, that is, having both surfaces 14 and 15 parallel. The shield would be shaped to define one of the faces of the finished lens. This shield 13 is constructed of a glass, with the thickness on the order of 1 millimeter or less, which can be tempered chemically in a well-known manner, such as in sodium or potassium salts in a water solution at between 400°–450° C.

A second thin shield of glass material having a similar thickness of less than 1 millimeter, is selected to have the proper configuration to define or form the other face of the completed lens.

After forming or otherwise obtaining the components, as described above, the components are assembled in any suitable manner, such as by hand or by machine with the lens body 10 confined between a pair of the shields. The lens 10 is then shaped to its final finished configuration by heating and applying a pressure thereto by means of the finished shields and simultaneously therewith bonding the shields thereto by a suitable transparent glue, such as a thin film of vinyl acteal, or other suitable bonding material.

Turning now to FIG. 3, a bifocal lens may be constructed, in accordance with the steps of the present invention, wherein the central lens body is made up of a main body portion 16 and may be composed of a first plastic material having a first index of refraction exceeding that of glass, and the second optical or body 17 of the main or central body portion of the lens being composed of a material having a higher index of refraction than that of the first body material. The lens body is placed between and shaped by means of a pair of shield components 18 and 19, and pressure is applied as necessary to form the finished lens.

Turning now to FIG. 4, there is illustrated still a further embodiment wherein the central body portion, generally indicated by the numeral 20, is made by forming an upper portion 21 of the main body of a first general configuration to define a first optical portion having a first optical power and a second or lower optical portion 22 of a different material and shaped to have a different optical power. Thus, a bifocal may be formed by the above method wherein the central body portion is of the same material, as the second optical portion. Alternately, the second portion 22 may be an insert 22 constructed of a second material having a higher index of refraction than that of the material of the first body. The second body portion 22 is then welded by sonic or ultrasonic welding to the first body portion 21. These body portions 21 and 22 are then confined between a pair of shields 23 and 24 of the appropriate configuration and heat and pressure then applied to shape the lens to its final configuration.

Turning now to FIG. 5, still another method, in accordance with the present invention, for forming a bifocal lens is illustrated. In this embodiment, a central lens body, indicated generally by the numeral 25, is formed as above having an upper optical portion 26 and a lower optical portion 27 each of which have different powers because of their configurations. In this embodiment, a glass shield 28 is formed with a negative lens portion 29 at the lower edge thereof which cooperates with the lens portion 27 to form the lens having the desired optical characteristics. The second shield portion 30 is plano as above.

By this method, a lens of a given power can be constructed to be lighter and have less thickness than lenses of equivalent power known in the prior art. For example, a lens having a 52 millimeter diameter and a +17 dioptic correction, would appear as follows: glass would have a 15.1 millimeter thickness at the outer edges to provide the necessary correction, plus a 2 millimeter thickness at the center or edge (required by law) which adds up to a total of 17.1 millimeter thicknesses. A plastic lens of the prior art would have a thickness of 16.4 millimeters to provide the desired correction, plus a minimum thickness at the center of 2 millimeters (as required by law) to add up to a total of 18.4 millimeters thicknesses at the outer edges. With the present invention, however, the material would have a 10 millimeter thickness to provide the desired dioptic correction, plus a 2 millimeter thickness at the center (as required by law) adding up to a total of 12 millimeters thickness for the glasses. Thus, a lens of the present invention can be constructed having a thickness of as much as 5 millimeters less than that of the known prior art.

Turning now to FIG. 6, there is illustrated suitable apparatus for carrying out the assembly step of the present invention. The apparatus comprises a jig indicated generally at 31 comprising a base 32 having a central ring support track or raceway 33 in which is rotatably mounted a support ring 34. The base member 32 includes an upper annular surface 35 surrounding the ring 34 which is divided into 360° with a suitable scale formed thereon indicating the divisions from 0° to 360°. A suitable pointer 36 is secured to the ring 34. This is so that the reference line of the lens components may be properly oriented in the jig.

The jig further includes adjustable stop means such as a pair of rods 37 and 38 threadably mounted in lugs 39 and 40 extending from base 32. A pair of lock nuts 41 and 42 may be provided for locking the stop rods 37 and 38 in place.

Suitable pressure applying means such as a press are provided and includes a movable upper ring 43 connected by rods or legs 44 to a ball 45 mounted in a socket 46 on a piston 47. The piston 47 is mounted in a bore 48 of a cylinder 49. The upper end of the cylinder 49 is connected e.g. at 50 to suitable frame means or the like for reaction purposes.

A suitable pressurized fluid is introduced into the cylinder via a conduit 51 in a well known manner for acting on piston 47 to transmit a force to ring 43. Any suitable press may be utilized.

In accordance with the preferred method or process of the present invention, a supply of blanks such as 10 of any one of a number of suitable plastic materials are provided. Each body for a single power lens is provided with suitable indicia such as a removable label stuck by suitable adhesive to the face thereof indicating the refractive index of the material. Blanks for multi-vision are provided with a label indicating the index of refraction for the separate portions of the lens and/or the different powers of the separate portions. The reference line can be simply a straight line extending across the label across the face of the lens body. The reference line is then properly aligned with the proper reference on the indicator dial 35 of the jig 31.

A plurality of shields having all possible required configurations are provided. The shields are similarly labeled as to reference line, optical center and radius of curvature. These indicia are similarly provided on a peel off label.

Thus, in making up a lens, in accordance with the invention, one simply proceeds by selecting a blank 10 of a suitable transparent plastic material having an index of refraction greater than crown glass 1.5174, selecting first and second shields having the proper curvature and reference lines, such that confining the blank body portion between the shields, shaping the body portion by applying heat as needed to the body and pressure as needed to the body via the shield thereby sizing and shaping the body portion to define a lens having the proper thickness, curvature, and angle of inclination.

The use of a jig and press, as illustrated in FIG. 6 and described above, improves the speed and accuracy of the method. Thus, one simply selects the proper combination of a shield and lens body portion and places a first shield 52 in the jig resting on support ring 34 which has been properly rotated such that pointer 36 points to the proper angle such as 180° with the reference line of the shield coinciding with the 180° line of the jig. The blank 53 is then placed in the jig on shield 52 with any reference line thereof properly oriented and the label then removed. The second shield 54 is then placed in the jig with the reference line thereof properly oriented and the label thereof may then be removed. The stop means 37 and 38 of the jig is then properly adjusted to be engaged by arms 55 and 56 extending from the ring to give the proper angle of one face of the lens with respect to the other. The body 53 is then heated to a state to be readily shaped by applying pressure to the two shields.

Heat may be applied to the blank 53 in any suitable manner, and may be applied prior to or after loading into the jig. For example, it may be heated in an oven or by radiant heat after mounting in the jig.

The present method provides a factual, accurate and efficient method of constructing lenses.

While the present invention has been illustrated and described by means of preferred embodiments, it is to be understood that numerous changes and modifications may be made therein without departing from the spirit and scope of the invention as defined by the appended claims.

What is claimed is:

1. A method of making opthalmic lenses, comprising the steps of:
    selecting a transparent plastic material having an index of refraction exceeding that of crown glass and being above about 1.65 forming at least the major body portion of a first lens body from said transparent plastic resinous material having an index of refraction greater than that of crown glass;
    selecting first and second thin glass shields, one of said shields having the shape and radius for defining one side of a finished lens and the other of said shields having the shape and radius for defining the other side of said finished lens;
    shaping said first lens portion to provide the desired optical power; and,
    simultaneously therewith bonding each of said glass shields to its correspondingly shaped surfaces of said first lens portion.

2. The method of claim 1 wherein the step of shaping said first lens portion is carried out by compression molding a semi-finished first body between said first and said second shields.

3. The method of claim 2 wherein the step of forming said first body portion comprises forming said body portion from phenol formaldehyde having a refraction index of 1.7.

4. The method of claim 2 comprising the step of forming the first body portion from polyvinyl carbazole having an index of refraction of 1.68.

5. The method of claim 2 including the step of forming a minor portion of said lens body from a second transparent plastic resinous material and having an index of refraction greater than the index of refraction of said first resinous material, thereby forming a lens body having bifocal characteristics.

6. The method of claim 2 comprising the further steps of forming said lens into a bifocal lens by forming a negative lens portion in one of said shields of glass, and forming said first body portion to combine with said negative lens portion to provide the desired optical power.

7. The method of claim 3 wherein the step of forming said lens comprises shaping said first lens body to form a bifocal lens.

8. The method of claim 2 including forming a second body portion of a second plastic material having an index of refraction different from said first body portion; and,
    sonically welding said second body portion to said first body portion for thereby forming a second lens portion of a bifocal lens.

9. An opthalmic lens comprising:
    a first central body portion made of a transparent plastic resin having an index of refraction greater than that of crown glass and being above about 1.65 and shaped to define a lens having a first predetermined power; and,
    a plano shield of tempered glass having a thickness of approximately one millimeter secured to and covering each face of said lens.

10. The lens of claim 9 comprising a second body portion made from a plastic resin having an index of refraction greater than the index of said first portion offset from the center of said first portion defining a lens portion having a second predetermined power for thereby defining with said first body portion a multifocal lens.

11. The lens of claim 10 wherein said second body portion is sonically welded to a portion of one face of said first body portion.

12. The lens of claim 10 wherein said second body portion forms a distinct portion of said lens separate from said first body portion.

13. The lens of claim 9 including a negative power lens portion formed in one of said plano shields offset from the center thereof; and,
    the portion of said lens overlapped by said negative power lens portion cooperating therewith to define a lens portion having a power different from that of the main portion of the lens.

* * * * *